(12) United States Patent
Hosono (10) Patent No.: US 8,989,072 B2
(45) Date of Patent: Mar. 24, 2015

(54) RADIO BASE STATION AND MOBILE COMMUNICATION METHOD FOR DETERMINING A COMMUNICATION PARAMETER

(75) Inventor: Hiroyuki Hosono, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 428 days.

(21) Appl. No.: 13/057,031

(22) PCT Filed: Jul. 31, 2009

(86) PCT No.: PCT/JP2009/063679
§ 371 (c)(1),
(2), (4) Date: May 6, 2011

(87) PCT Pub. No.: WO2010/013814
PCT Pub. Date: Feb. 4, 2010

(65) Prior Publication Data
US 2011/0205950 A1    Aug. 25, 2011

(30) Foreign Application Priority Data

Aug. 1, 2008    (JP) ................................. 2008-200260

(51) Int. Cl.
*H04W 28/26* (2009.01)
*H04W 24/02* (2009.01)
(Continued)

(52) U.S. Cl.
CPC .............. *H04W 24/02* (2013.01); *H04W 16/16* (2013.01); *H04W 84/045* (2013.01)
USPC ........................................................ 370/312

(58) Field of Classification Search
CPC . H04W 84/045; H04W 84/042; H04W 84/04; H04W 84/005; H04W 24/02; H04W 16/16; A61B 2560/0209; A61B 5/0024; A61B 5/0022
USPC ........ 370/328, 338, 342, 312, 329; 455/422.1
See application file for complete search history.

(56) References Cited

U.S. PATENT DOCUMENTS

| 5,873,047 A | 2/1999 | Nakano et al. | |
| 2003/0220102 A1* | 11/2003 | Kallio | 455/422.1 |

(Continued)

FOREIGN PATENT DOCUMENTS

| JP | 9-116953 | 5/1997 |
| JP | 2003 219478 | 7/2003 |

(Continued)

OTHER PUBLICATIONS

International Search Report issued Sep. 1, 2009 in PCT/JP09/63679 filed Jul. 31, 2009.

(Continued)

*Primary Examiner* — Pao Sinkantarakorn
*Assistant Examiner* — Richard Chang
(74) *Attorney, Agent, or Firm* — Oblon, McClelland, Maier & Neustadt, L.L.P.

(57) ABSTRACT

A radio base station according to the present invention includes a common control information acquisition unit 11 to acquire common control information broadcast by a first neighboring radio base station; a neighboring radio base station information acquisition unit 12 to acquire radio base station information held by a second neighboring radio base station via a wired network; and a communication parameter determination unit 13 to determine a communication parameter to be used based on a first communication parameter, a second communication parameter, and a third communication parameter, the first communication parameter included in the acquired common control information and used by the first neighboring radio base station, the second communication parameter included in the acquired common control information and used by a radio base station neighboring the first neighboring radio base station, the third communication parameter included in the acquired radio base station information and used by the second neighboring radio base station.

7 Claims, 4 Drawing Sheets

(51) Int. Cl.
  *H04W 16/16* (2009.01)
  *H04W 84/04* (2009.01)

(56) References Cited

U.S. PATENT DOCUMENTS

| | | | |
|---|---|---|---|
| 2005/0282562 A1* | 12/2005 | Lee et al. | 455/458 |
| 2006/0072532 A1* | 4/2006 | Dorenbosch et al. | 370/342 |
| 2007/0093268 A1 | 4/2007 | Hosono et al. | |
| 2007/0218914 A1 | 9/2007 | Mori et al. | |
| 2008/0002614 A1* | 1/2008 | Hanabusa et al. | 370/328 |
| 2008/0002651 A1* | 1/2008 | Nakano | 370/338 |
| 2008/0198798 A1* | 8/2008 | Wu et al. | 370/328 |

FOREIGN PATENT DOCUMENTS

| | | |
|---|---|---|
| JP | 2005 142967 | 6/2005 |
| JP | 2007 116392 | 5/2007 |
| JP | 2007 251755 | 9/2007 |
| JP | 2007 295318 | 11/2007 |
| JP | 2007-329758 | 12/2007 |
| JP | 2008 124575 | 5/2008 |
| JP | 2008 124576 | 5/2008 |

OTHER PUBLICATIONS

"Requirements for LTE Home eNodeBs", 3 GPP TSG RAN #35, RP-070209, Orange, Telecom Italia, T-Mobile, Vodafone, Total 4 pages, (Mar. 6-9, 2007).

Japanese Office Action issued Jun. 19, 2012, in Japan Patent Application No. 2008-200260 (with English translation).

Office Action issued Apr. 9, 2013 in Chinese Patent Application No. 200980130896.2 with English language translation.

Office Action issued on Dec. 30, 2013 in Chinese Patent Application No. 200980130896.2, along with its English translation.

Office Action issued Sep. 9, 2014 in Chinese Patent Application No. 200980130896.2 (with English language translation).

Extended European Search Report issued Jun. 6, 2014 in Patent Application No. 09803052.1.

* cited by examiner

RADIO BASE STATION AND MOBILE COMMUNICATION METHOD FOR DETERMINING A COMMUNICATION PARAMETER

TECHNICAL FIELD

The present invention relates to a radio base station and a mobile communication method.

BACKGROUND ART

A mobile communication system needs to be designed in such a way that communication parameters (e.g., such as a spread code, frequency, time slot, neighboring cell list, and transmission power) do not overlap between macro-cell radio base stations, of which their respective macro cells adjacent to each other.

To achieve this, a mobile telecommunications carrier has estimated an area that radio waves from each macro-cell radio base station can reach by conducting a simulation taking into consideration an installation location and a configuration (antenna configuration) of each of the radio base stations, thereby setting communication parameters in each macro-cell radio base station.

When installing a new macro-cell radio base station for the increase in traffic thereafter, the mobile telecommunications carrier needs to set again the communication parameters in each macro-cell radio base station.

Such a method for setting the communication parameters is based on the result of the estimation of the area that the radio waves of each macro-cell radio base station can reach by the simulation. For this reason, when errors actually occur in the result of the estimation of the area that the radio waves of each macro-cell radio base station can reach, the communication parameters sometimes overlap between the radio base stations under which respective macro cells adjacent to each other, and that will bring interference.

In recent years, studies have been made for operational methods of a so-called femto-cell radio base station (Home eNB) which is a radio base station installed in a small area such as a home.

The number of the femto-cell radio base stations to be installed is expected to increase much more than the number of the macro-cell radio base stations installed. The increase of the femto-cell radio base stations leads to an increase in workload required for the method for setting the communication parameters.

As a method for reducing the workload required for the method for setting the communication parameters, there has been proposed a method as follows. In the method, a radio base station in a W-CDMA mobile communication system receives and demodulates a downlink radio signal transmitted by a neighboring radio base station, thereby determining a downlink scrambling code already used by the neighboring radio base station. Then, a downlink scrambling code to be used by the radio base station is automatically determined based on the result of the determination.

SUMMARY OF THE INVENTION

Problem to be Solved by the Invention

However, in the method described above, the radio base station cannot recognize a downlink radio signal near an edge of a cell transmitted by a neighboring radio base station, of which a cell overlaps with a cell under the radio base station. This will cause a problem that the radio base station cannot recognize a downlink scrambling code used by the neighboring radio base station.

Such a problem is considered to be likely to occur particularly in a femto-cell radio base station which is installed in a home of a user and whose downlink radio signal is significantly attenuated by a wall and the like in the home.

Therefore, the present invention has been made in consideration of the above problems. It is an objective of the present invention to provide a radio base station and a mobile communication method, which are capable of properly and automatically setting a communication parameter.

Means for Solving the Problem

The first feature of the present invention is summarized in that a radio base station including: a common control information acquisition unit configured to acquire common control information broadcast by a first neighboring radio base station; a neighboring radio base station information acquisition unit configured to acquire radio base station information held by a second neighboring radio base station via a wired network; and a communication parameter determination unit configured to determine a communication parameter to be used based on a first communication parameter, a second communication parameter, and a third communication parameter, the first communication parameter included in the acquired common control information and used by the first neighboring radio base station, the second communication parameter included in the acquired common control information and used by a radio base station neighboring the first neighboring radio base station, the third communication parameter included in the acquired radio base station information and used by the second neighboring radio base station.

The second feature of the present invention is summarized in that a mobile communication method comprising the steps executed by a radio base station of: acquiring common control information broadcast by a first neighboring radio base station; acquiring radio base station information held by a second neighboring radio base station via a wired network; and determining a communication parameter to be used based on a first communication parameter, a second communication parameter, and a third communication parameter, the first communication parameter included in the acquired common control information and used by the first neighboring radio base station, the second communication parameter included in the acquired common control information and used by a radio base station neighboring the first neighboring radio base station, the third communication parameter included in the acquired radio base station information and used by the second neighboring radio base station.

Effects of the Invention

As described above, the present invention can provide a radio base station and a mobile communication method, which are capable of properly and automatically setting a communication parameter.

MODES FOR CARRYING OUT THE INVENTION (Configuration of Mobile Communication System According to First Embodiment of the Present Invention)

With reference to FIGS. 1 to 4, description is given of a configuration of a mobile communication system according to a first embodiment of the present invention.

Figure 1:
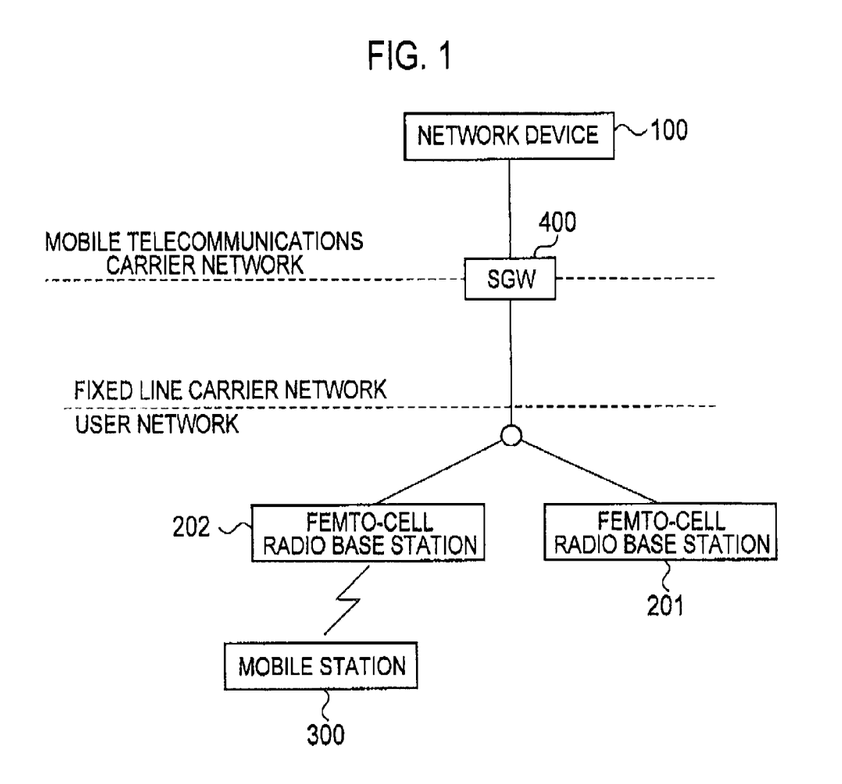
FIG. 1 is an overall configuration diagram of a mobile communication system according to a first embodiment of the present invention.

As shown in FIG. 1, the mobile communication system according to this embodiment includes a network device 100, a gateway device (SGW Security Gateway) 400 and femto-cell radio base stations 201 and 202.

The femto-cell radio base stations 201 and 202 are accommodated in the network device 100.

The network device 100 is configured to manage the femto-cell radio base stations 201 and 202 in such a way as to allocate to the femto-cell radio base stations 201 and 202 communication parameters (e.g., such as a spread code, frequency, time slot, neighboring cell list, and transmission power) for communicating with a mobile station 300.

The network device 100 is configured of, for example, a radio controller RNC, an exchange, and the like, which are provided in a mobile telecommunications carrier network managed by a mobile telecommunications carrier.

The gateway device 400 is installed on the borderline of the mobile telecommunications carrier network. The gateway device 400 is a gateway device for protecting the mobile telecommunications carrier network against unauthorized access from other networks, and is configured to admit only the access that is authenticated by authentication processing of the gateway device 400 to the mobile telecommunications carrier network.

The femto-cell radio base stations 201 and 202 are radio base stations provided in a user network outside the mobile telecommunications carrier network (i.e., a network managed by a user who is subscribed to the mobile telecommunications carrier).

For example, the femto-cell radio base stations 201 and 202 are installed in a LAN (Local Area Network) managed by the above-mentioned subscribed user, and is connected to the network device 100 located on the mobile telecommunications carrier network through an access-line provider network (fixed line carrier network) such as FTTH (Fiber To The Home) or ADSL (Asymmetric Digital Subscriber Line).

Figure 2:
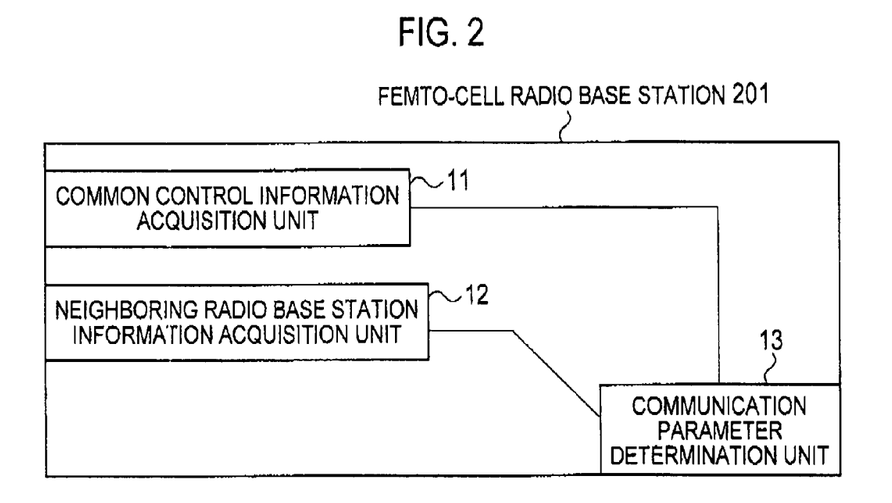
FIG. 2 is a functional block diagram of a femto-cell radio base station according to the first embodiment of the present invention.

With reference to FIG. 2, a configuration of each of the femto-cell radio base stations 201 and 202 is described below. Since the femto-cell radio base stations 201 and 202 basically have the same configuration, the configuration of the femto-cell radio base station 201 is described exemplarily.

As shown in FIG. 2, the femto-cell radio base station 201 includes a common control information acquisition unit 11, a neighboring radio base station information acquisition unit 12, and a communication parameter determination unit 13.

The common control information acquisition unit 11 is configured to acquire common control information broadcast by a first neighboring radio base station. Note that the common control information includes: a first communication parameter used by the first neighboring radio base station; and a second communication parameter used by a second neighboring radio base station.

Here, the first neighboring radio base station is a radio base station from which the femto-cell radio base station 201 can receive the common control information. In an example shown in FIG. 3, for example, the common control information acquisition unit 11 can receive the common control information broadcast by radio base stations B, C and D, but cannot receive the common control information broadcast by a radio base station A due to existence of an obstacle X such as a wall. Therefore, in the example shown in FIG. 3, the radio base stations B to D serve as the first neighboring radio base stations.

The neighboring radio base station information acquisition unit 12 is configured to acquire radio base station information held by a second neighboring radio base station via a wired network.

The wired network is, for example, a LAN (Local Area Network), a WAN (Wide Area Network), a VLAN (Virtual LAN), or the like. The second neighboring radio base station is a radio base station connected to the same network as that of the femto-cell radio base station 201 (i.e., a radio base station given the same network address or subnetwork address as that of the femto-cell radio base station 201).

Figure 4:
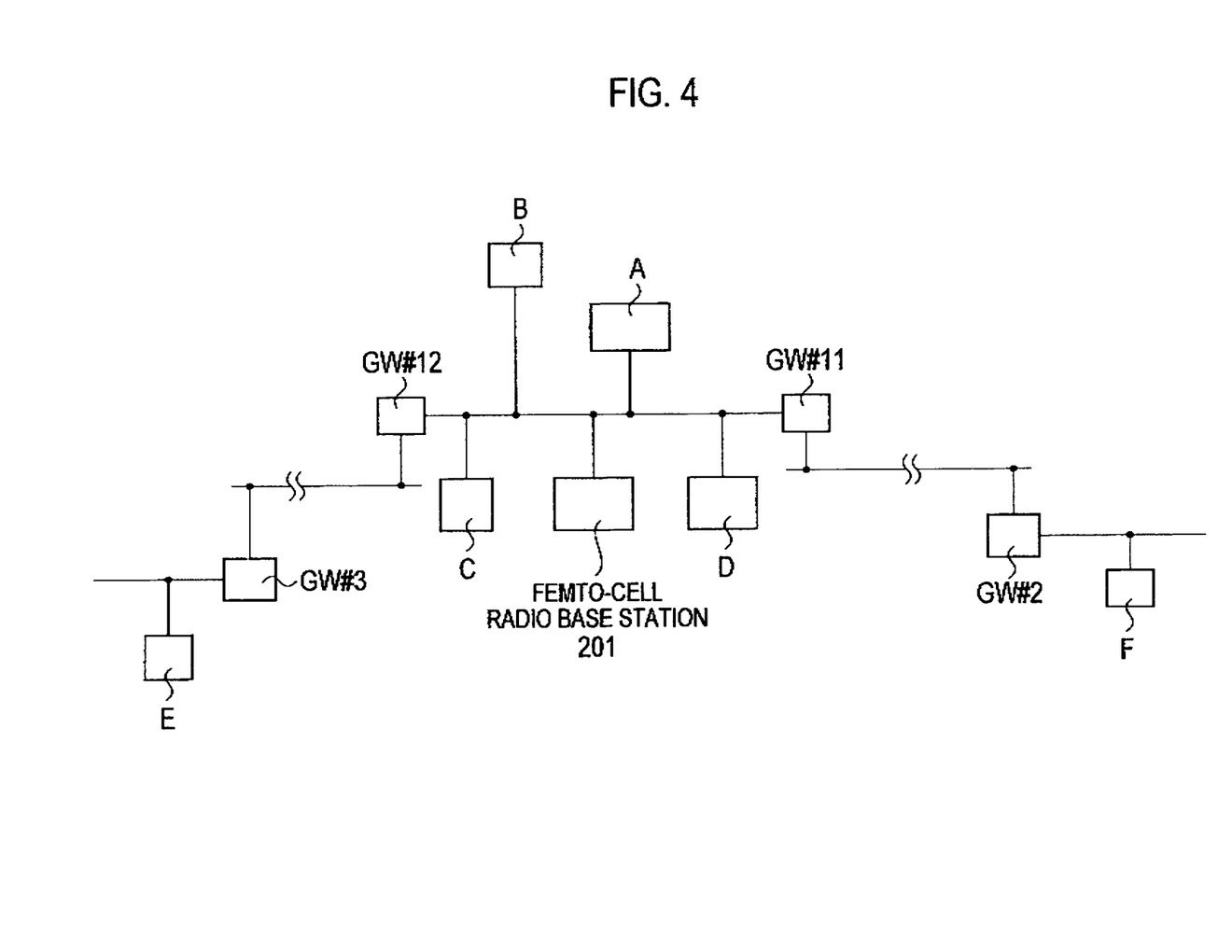
FIG. 4 is a diagram showing how the femto-cell radio base station according to the first embodiment of the present invention acquires neighboring radio base station information.

In an example shown in FIG. 4, the neighboring radio base station information acquisition unit 12 is configured to acquire radio base station information from radio base stations A to F connected in the same network.

Note that the radio base station information includes identification information on each of the radio base stations, and a third communication parameter used by the second neighboring radio base station. For example, the radio base station information is transmitted in the form of an IP packet.

The neighboring radio base station information acquisition unit 12 may be configured not to acquire the radio base station information that reaches the femto-cell radio base station 201 with a predetermined number or more of hops within the wired network.

In the example shown in FIG. 4, when the predetermined number is set to "2" and the number of hops required for radio base station information held by the radio base station F to reach the femto-cell radio base station 201 is "3", the neighboring radio base station information acquisition unit 12 may be configured not to acquire the radio base station information held by the radio base station F.

Furthermore, the neighboring radio base station information acquisition unit 12 may be configured not to acquire the radio base station information from the second neighboring radio base station if it takes a predetermined time or more for the second neighboring radio base station to respond within the wired network.

In the example shown in FIG. 4, when the predetermined time is set to "3 seconds" and a response time (RTT: Round Trip Time) between the femto-cell radio base station 201 and the radio base station E is "5 seconds", the neighboring radio base station information acquisition unit 12 may be configured not to acquire the radio base station information held by the radio base station E.

The neighboring radio base station information acquisition unit 12 may be configured to multicast information on the femto-cell radio base station 201 within the wired network, and then to acquire the radio base station information described above as a response to the multicast information on the femto-cell radio base station 201.

Here, the information on the femto-cell radio base station 201 includes: identification information on the femto-cell radio base station 201 (e.g., such as an IP address assigned thereto in the wired network); communication parameters used by the femto-cell radio base station 201; and the like.

The communication parameter determination unit 13 is configured to determine communication parameters to be used by the femto-cell radio base station 201, based on the first and second communication parameters included in the common control information acquired by the common control information acquisition unit 11 and a third communication parameter acquired by the neighboring radio base station information acquisition unit 12.

The communication parameter determination unit 13 may be configured, for example, to determine a communication parameter to be used by the femto-cell radio base station 201 in such a way that the communication parameter overlaps with none of the first to third communication parameters.

Note that the communication parameter determination unit 13 may be configured to determine a communication parameter to be used by the femto-cell radio base station 201 without having to consider a third parameter included in the radio base station information that reaches the femto-cell radio base station 201 with a predetermined number or more of hops within the wired network.

Moreover, the communication parameter determination unit 13 may be configured to determine a communication parameter to be used by the femto-cell radio base station 201 without having to consider the radio base station information held by the second neighboring radio base station if it takes a predetermined time or more for the second neighboring radio base station to respond within the wired network.

Furthermore, the communication parameter determination unit 13 may be configured to determine a communication parameter to be used by the femto-cell radio base station 201 when it is detected that at least one of the first to third communication parameters is changed.

(Operations of Mobile Communication System According to First Embodiment of the Present Invention)

Figure 5:
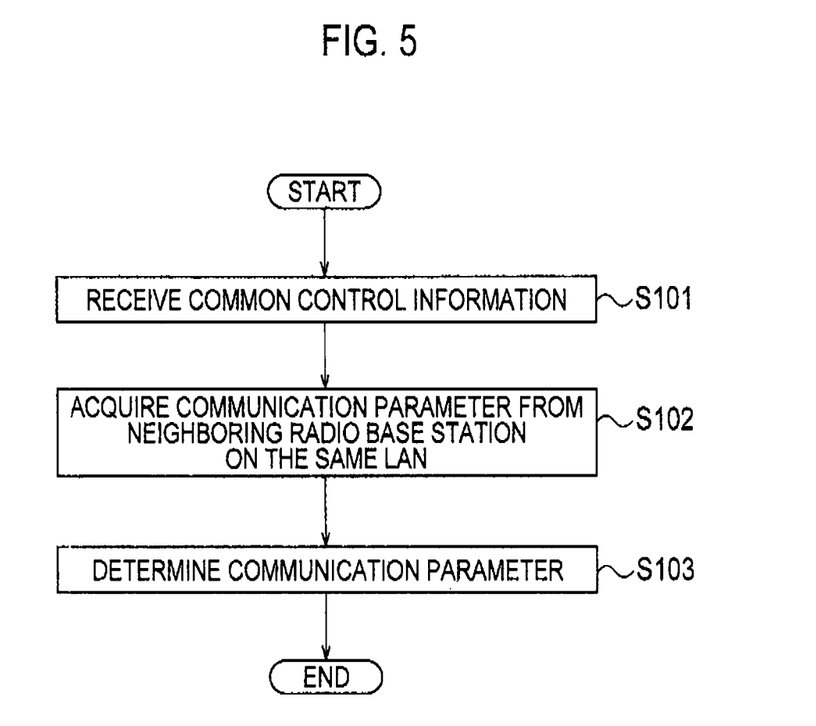
FIG. 5 is a flowchart showing operations of the femto-cell radio base station according to the first embodiment of the present invention.

With reference to FIG. 5, description is given of operations of the mobile communication system according to the first embodiment of the present invention. More specifically, description is given of an operation of determining an operation parameter to be used by the femto-cell radio base station 201 that is newly installed.

Figure 3:
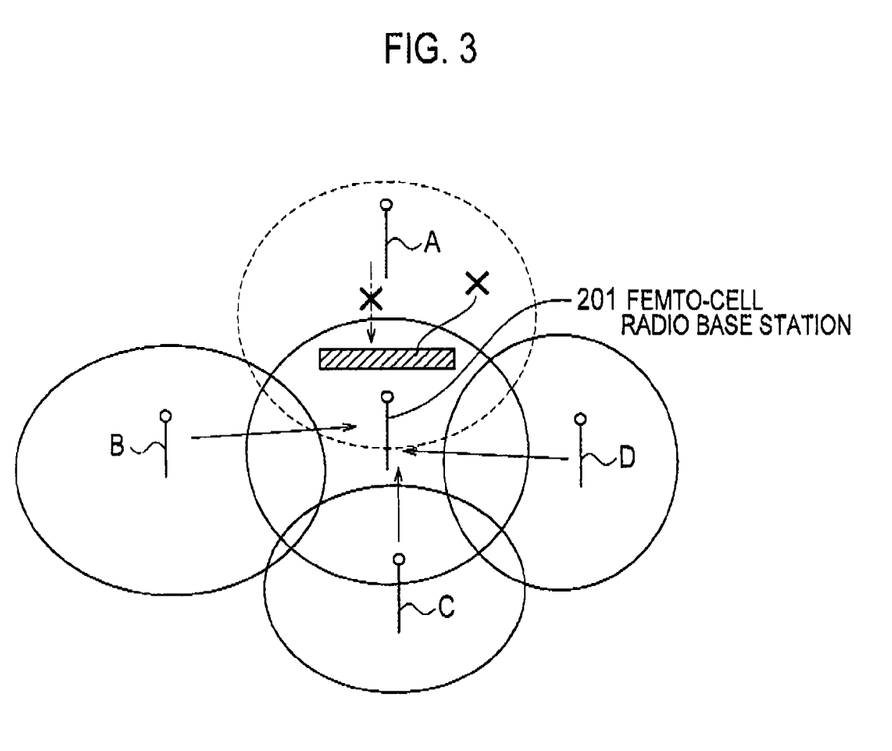
FIG. 3 is a diagram showing how the femto-cell radio base station according to the first embodiment of the present invention acquires common control information.

As shown in FIG. 5, in Step S101, the femto-cell radio base station 201 acquires common control information broadcast by a first neighboring radio base station, i.e., the radio base stations B to D in the example shown in FIG. 3.

Here, an installation location of the femto-cell radio base station 201 is not in an area covered by the radio base station A, and the area covered by the radio base station A partially overlaps with that of the femto-cell radio base station 201. For this reason, the femto-cell radio base station 201 cannot acquire common control information broadcast by the radio base station A.

In Step S102, the femto-cell radio base station 201 acquires radio base station information held by a second neighboring radio base station on a LAN on which the femto-cell radio base station 201 is installed, i.e., by the radio base stations A to F in the example shown in FIG. 4.

To be more specific, the femto-cell radio base station 201 first makes an announcement by multicasting the information on the femto-cell radio base station 201 (including, for example, the IP address of the femto-cell radio base station 201) onto the LAN.

Secondly, in response to the announcement described above, the radio base stations A to F connected to the LAN detect that the femto-cell radio base station 201 is newly installed on the LAN, and transmit radio base station information (including, for example, IP addresses of the radio base stations A to F and the third communication parameter) to the femto-cell radio base station 201.

In Step S103, the femto-cell radio base station 201 determines a communication parameter to be used based on the first and second communication parameters included in the common control information acquired in Step S101 and the third communication parameter included in the radio base station information acquired in Step S102.

Note that description is given, in this embodiment, of the case where the femto-cell radio base station 201 performs the operation of Step S102 after the operation of Step S101. However, the both operations may be performed independently of each other.

That is, the femto-cell radio base station 201 may acquire the common control information broadcast by the first neighboring radio base station after acquiring the radio base station information held by the second neighboring radio base station on the LAN on which the femto-cell radio base station 201 is installed. Alternatively, the femto-cell radio base station 201 may acquire the common control information broadcast by the first neighboring radio base station while acquiring the radio base station information held by the second neighboring radio base station on the LAN on which the femto-cell radio base station 201 is installed.

In addition, the femto-cell radio base station 201 and the radio base stations A to F may be allowed to exchange information on the radio base stations on the same LAN by using a UPnP (Universal Plug & Play) protocol, i.e., by making such modification that the information on the radio base stations can be handled according to the UPnP protocol.

Furthermore, the femto-cell radio base station 201 may determine a communication parameter to be used based on notification from the radio controller RNC, although the femto-cell radio base station 201 determines a communication parameter to be used based on the first to third communication parameters in this embodiment. Specifically, the femto-cell radio base station 201 notifies the radio controller RNC of the first to third communication parameters, and the radio controller RNC determines a communication parameter to be used by the femto-cell radio base station 201 based on the first to third communication parameters, and notifies the femto-cell radio base station 201 of the result. Then, the femto-cell radio base station 201 determines the communication parameter to be used based on the notification from the radio controller RNC.

(Advantageous Effects of Mobile Communication System According to First Embodiment of the Present Invention)

The mobile communication system according to the first embodiment of the present invention enables a femto-cell radio base station to be installed without increasing workload of a mobile telecommunications carrier, since the femto-cell radio base station 201 can properly and automatically set a communication parameter to be used based on the first to third communication parameters.

The mobile communication system according to the first embodiment of the present invention allows the femto-cell radio base station 201 to properly determine a communication parameter even if there is a radio base station which cannot acquire common control information due to an obstacle or the like around the femto-cell radio base station 201. This is because the femto-cell radio base station 201 determines a communication parameter to be used based not only on the first and second communication parameters included in the common control information broadcast by the first neighboring radio base station, but also on the third communication parameter included in the radio bas station information notified by the second neighboring radio base station connected on the same LAN.

(Modified Example)

While the description has been given by taking a W-CDMA mobile communication system as an example in the above embodiment, the present invention is not limited to such a mobile communication system, but applicable also to, for example, an LTE (Long Term Evolution) mobile communication system.

Features of the embodiment described above may be expressed as follows.

A first feature of the embodiment provides a radio base station (femto-cell radio base station 201) which includes: a common control information acquisition unit 11 configured to acquire common control information broadcast by a first neighboring radio base station; a neighboring radio base station information acquisition unit 12 configured to acquire radio base station information held by a second neighboring radio base station via a wired network (the same LAN); and a communication parameter determination unit 13 configured to determine a communication parameter to be used based on a first communication parameter, a second communication parameter, and a third communication parameter, the first communication parameter included in the acquired common control information and used by the first neighboring radio base station, the second communication parameter included in the acquired common control information and used by a radio base station neighboring the first neighboring radio base station, the third communication parameter included in the acquired radio base station information and used by the second neighboring radio base station.

In the first feature of the embodiment, the neighboring radio base station information acquisition unit 12 may be configured not to acquire radio base station information that reaches the radio base station with not less than a predetermined number of hops within the wired network.

In the first feature of the embodiment, the neighboring radio base station information acquisition unit 12 may be configured not to acquire the radio base station information from a second neighboring radio base station if it takes not less than a predetermined time for the second neighboring radio base station to respond within the wired network.

In the first feature of the embodiment, the neighboring radio base station information acquisition unit 12 may be configured to multicast information on the radio base station within the wired network, and to acquire the radio base station information as a response to the multicast information on the radio base station.

In the first feature of the embodiment, the information on the radio base station may include identification information on the radio base station and a communication parameter used by the radio base station.

In the first feature of the embodiment, the communication parameter determination unit 13 may be configured to determine a communication parameter to be used when it is detected that at least one of the first communication parameter, the second communication parameter, and the third parameter is changed.

A second feature of the embodiment provides a mobile communication method including the steps executed by a radio base station (femto-cell radio base station 201) of acquiring common control information broadcast by a first neighboring radio base station; acquiring radio base station information held by a second neighboring radio base station via a wired network; and determining a communication parameter to be used based on a first communication parameter, a second communication parameter, and a third communication parameter, the first communication parameter included in the acquired common control information and used by the first neighboring radio base station, the second communication parameter included in the acquired common control information and used by a radio base station neighboring the first neighboring radio base station, the third communication parameter included in the acquired radio base station information and used by the second neighboring radio base station.

In the second feature of the embodiment, the method may further includes the steps of: multicasting, by the radio base station, information on the radio base station within the wired network; and transmitting, by the second neighboring radio base station, the radio base station information to the radio base station as a response to the received information on the radio base station.

In the second feature of the embodiment, the method may further include the step of: transmitting, by the second neighboring radio base station, the radio base station information to the radio base station when the third parameter is changed.

Note that operation of the above described femto-cell radio base station 200, 201 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the femto-cell radio base station 200, 201. Also, the storage medium and the processor may be provided in femto-cell radio base station 200, 201 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A radio base station comprising:
   a common control information acquisition unit configured to acquire common control information broadcast by one or more first neighboring radio base stations;
   a neighboring radio base station information acquisition unit configured to acquire radio base station information held by a plurality of second neighboring radio base stations via a wired network, wherein the one or more first neighboring radio base stations are one or more of the plurality of second neighboring radio base stations and the plurality of second neighboring radio base stations is connected to a network given a same network address or subnetwork address as that of the radio base station; and
   a communication parameter determination unit configured to determine a communication parameter to be used based on a first communication parameter, a second communication parameter, and a third communication parameter, the first communication parameter included in the acquired common control information and used by the one or more first neighboring radio base stations, the second communication parameter included in the acquired common control information and used by a radio base station neighboring the one or more first neighboring radio base stations, the third communication parameter included in the acquired radio base station information and used by the plurality of second neighboring radio base stations, wherein the neighboring radio base station information acquisition unit is configured to multicast information on the radio base station within the wired network, and to acquire the radio base station information as a response to the multicast information on the radio base station, and wherein the information on the radio base station includes identification information on the radio base station and a communication parameter used by the radio base station.

2. The radio base station according to claim 1, wherein the neighboring radio base station information acquisition unit is configured not to acquire radio base station information that reaches the radio base station with not less than a predetermined number of hops within the wired network.

3. The radio base station according to claim 1, wherein the neighboring radio base station information acquisition unit is configured not to acquire the radio base station information from a second neighboring radio base station if it takes not less than a predetermined time for the second neighboring radio base station to respond within the wired network.

4. The radio base station according to claim 1, wherein the communication parameter determination unit is configured to determine a communication parameter to be used when it is detected that at least one of the first communication parameter, the second communication parameter, and the third parameter is changed.

5. A mobile communication method comprising the steps executed by a radio base station of:

acquiring common control information broadcast by one or more first neighboring radio base stations;

acquiring radio base station information held by a plurality of second neighboring radio base stations via a wired network, wherein the one or more first neighboring radio base stations are one or more of the plurality of second neighboring radio base stations and the plurality of second neighboring radio base stations is connected to a network given a same network address or subnetwork address as that of the radio base station;

determining a communication parameter to be used based on a first communication parameter, a second communication parameter, and a third communication parameter, the first communication parameter included in the acquired common control information and used by the one or more first neighboring radio base stations, the second communication parameter included in the acquired common control information and used by a radio base station neighboring the one or more first neighboring radio base stations, the third communication parameter included in the acquired radio base station information and used by the plurality of second neighboring radio base stations;

multicastinq information on the radio base station within the wired network; and acquiring the radio base station information as a response to the multicast information on the radio base station, wherein the information on the radio base station includes identification information on the radio base station and a communication parameter used by the radio base station.

6. The mobile communication method according to claim 5, further comprising the steps of:

transmitting, by the plurality of second neighboring radio base stations, the radio base station information to the radio base station as the response to the received information on the radio base station.

7. The mobile communication method according to claim 5, further comprising the step of transmitting, by the plurality of second neighboring radio base stations, the radio base station information to the radio base station when the third parameter is changed.

* * * * *